(12) United States Patent
Suzuki

(10) Patent No.: US 8,091,350 B2
(45) Date of Patent: Jan. 10, 2012

(54) EXHAUST PURIFICATION APPARATUS FOR ENGINE

(75) Inventor: Akira Suzuki, Kawasaki (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 468 days.

(21) Appl. No.: 12/339,772

(22) Filed: Dec. 19, 2008

(65) Prior Publication Data

US 2009/0158710 A1 Jun. 25, 2009

(30) Foreign Application Priority Data

Dec. 20, 2007 (JP) ................................ 2007-328634

(51) Int. Cl.
*F01N 3/10* (2006.01)
*F01N 3/00* (2006.01)
*F02M 25/06* (2006.01)
(52) U.S. Cl. .................. 60/301; 60/278; 60/285
(58) Field of Classification Search .............. 60/301
See application file for complete search history.

(56) References Cited

U.S. PATENT DOCUMENTS

| 5,884,476 | A * | 3/1999 | Hirota et al. | 60/278 |
|---|---|---|---|---|
| 6,997,142 | B2 * | 2/2006 | Wakao et al. | 123/3 |
| 7,334,400 | B2 * | 2/2008 | Yan et al. | 60/286 |
| 2002/0007821 | A1 * | 1/2002 | Isobe et al. | 123/480 |
| 2003/0084660 | A1 * | 5/2003 | Shigahara et al. | 60/284 |
| 2005/0223699 | A1 * | 10/2005 | Ancimer et al. | 60/286 |
| 2006/0010859 | A1 * | 1/2006 | Yan et al. | 60/286 |
| 2007/0028899 | A1 * | 2/2007 | Allen | 123/494 |
| 2007/0150154 | A1 | 6/2007 | Lenz | |
| 2008/0178575 | A1 * | 7/2008 | Shaikh et al. | 60/274 |

FOREIGN PATENT DOCUMENTS

| DE | 10 2006 007 122 A1 | 8/2007 |
|---|---|---|
| DE | 102006007122 A1 * | 8/2007 |
| JP | 2004-239109 A | 8/2004 |

OTHER PUBLICATIONS

First Office Action issued in corresponding German Patent Application No. 10 2008 061 150.6-13 dated Aug. 10, 2010. English translation provided.

* cited by examiner

*Primary Examiner* — Thomas Denion
*Assistant Examiner* — Jason Shanske
(74) *Attorney, Agent, or Firm* — Rossi, Kimms & McDowell LLP

(57) ABSTRACT

An exhaust purification apparatus for an engine comprises a selective reduction-type NOx catalyst that is interposed in an exhaust passage of the engine and selectively reduces NOx contained in exhaust gas of the engine, an EGR device that recirculates exhaust gas of the engine to an intake side of the engine, an exhaust-purification-efficiency estimation unit that estimates exhaust purification efficiency of the NOx catalyst with respect to NOx, a target-exhaust-purification-efficiency calculation unit that calculates target exhaust purification efficiency with respect to NOx on the basis of an operational state of the engine, and a control unit that controls the EGR device to compensate a decrease amount of the estimated exhaust purification efficiency to the target exhaust purification efficiency.

4 Claims, 3 Drawing Sheets

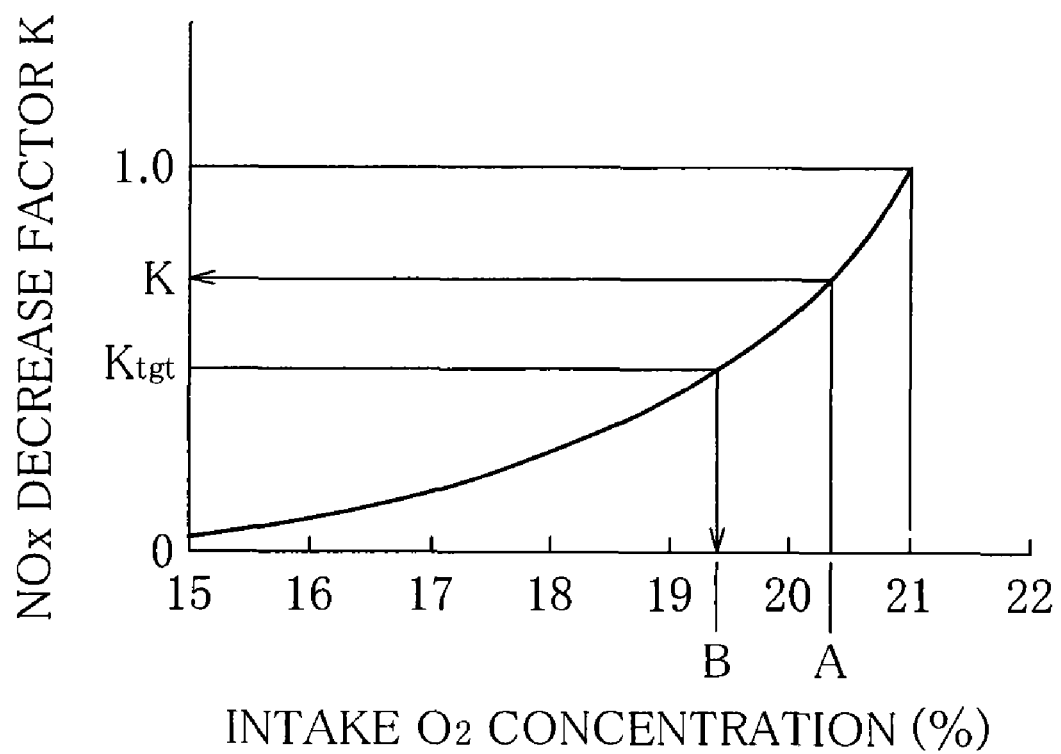

EXHAUST PURIFICATION APPARATUS FOR ENGINE

BACKGROUND OF THE INVENTION

1. Field of the Invention

The present invention relates to an exhaust purification apparatus for an engine, and more specifically, to an exhaust purification apparatus in which a selective reduction-type NOx catalyst that selectively reduces NOx contained in exhaust gas by using ammonia as a reducing agent is interposed in an exhaust passage of an engine.

2. Description of the Related Art

A NOx catalyst that is interposed in the exhaust passage of an engine and selectively reduces NOx contained in exhaust gas has been known as a device for purifying engine exhaust. When this kind of a selective reduction-type NOx catalyst is utilized, urea-water is injected from an injection nozzle that is set upstream of the NOx catalyst in the exhaust passage. The injected urea-water is hydrolyzed by exhaust gas heat and the water vapor contained in exhaust gas, and ammonia ($NH_3$) is produced. By using the ammonia ($NH_3$) thus produced as a reducing agent, the NOx contained in exhaust gas is selectively reduced by the NOx catalyst.

In order to control the selective reduction-type NOx catalyst to deliver satisfactory performance of exhaust purification that is carried out by selectively reducing NOx, the selective reduction-type NOx catalyst has to be kept at a temperature equal to or higher than activation temperature (200 degrees centigrade or higher, for example). However, depending upon vehicle running conditions such as traffic jams in urban districts or environmental conditions such as cold regions in which outdoor air temperature is low, the temperature of the NOx catalyst may fall below the activation temperature. There has been the problem that, in such a low temperature range, the exhaust purification efficiency of the NOx catalyst with respect to NOx drastically decreases, and that a NOx emission amount into the atmosphere is increased.

In consideration of this problem, for example, Unexamined Japanese Patent Application Publication No. 2004-239109 (hereinafter, referred to as Document 1) proposes a measure for well maintaining the performance of exhaust purification carried out by selectively reducing NOx even in a situation where the temperature of the NOx catalyst is decreased.

According to the technology described in Document 1, a pre-oxidation catalyst is placed in an exhaust port of each cylinder of a diesel engine. In an exhaust passage connected in common to each of the exhaust port, there are disposed the urea-water injection nozzle, a pre-selective reduction-type NOx catalyst, a main selective reduction-type NOx catalyst, and a main oxidation catalyst, in the order from upstream to downstream. The pre-oxidation catalyst has a function of oxidizing a portion of NO contained in exhaust gas into $NO_2$. This oxidative reaction of NO occurs even at low exhaust temperatures. The $NO_2$ thus produced is supplied to the pre-selective reduction-type NOx catalyst and the main selective reduction-type NOx catalyst together with the ammonia produced from the urea-water. By using the $NO_2$, these NOx catalysts offer an exhaust purifying operation that selectively reduces NOx.

Since the technology described in Document 1 uses the $NO_2$ produced in the pre-oxidation catalyst, it realizes the exhaust purifying operation that selectively reduces NOx within a lower temperature range, as compared to conventional technologies. On the other hand, Document 1 is similar to conventional art in that the pre-selective reduction-type NOx catalyst and the main selective reduction-type NOx catalyst have low temperatures. As Document 1 says, the technology described is only capable of lowering the lower limit of a temperature rage, in which the exhaust purifying operation that selectively reduces NOx can be achieved, to around 180 degrees centigrade, and is not capable of dramatically improving such exhaust purification performance in the low temperature range.

In the technology described in Document 1, the pre-oxidation catalyst is required to be separately disposed in the exhaust port of each cylinder of the engine for creating $NO_2$. For this reason, the technology described in Document 1 has the problem that the exhaust purification apparatus becomes greatly complicated in configuration and then that the production cost is inevitably increased.

SUMMARY OF THE INVENTION

An aspect of the present invention is directed to an exhaust purification apparatus for an engine, comprising: a selective reduction-type NOx catalyst that is interposed in an exhaust passage of an engine and selectively reduces NOx contained in exhaust gas of the engine by using ammonia as a reducing agent; EGR means for recirculating exhaust gas of the engine to an intake side of the engine; exhaust-purification-efficiency estimation means for estimating exhaust purification efficiency of the NOx catalyst with respect to NOx; target-exhaust-purification-efficiency calculation means for calculating target exhaust purification efficiency with respect to NOx on the basis of an operational state of the engine; and control means for controlling the EGR means to compensate a decrease amount of the estimated exhaust purification efficiency to the target exhaust purification efficiency.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIG. 3 is a graph showing relationship between intake $O_2$ concentration and a NOx decrease factor.

DETAILED DESCRIPTION OF THE INVENTION

An exhaust purification apparatus for an engine according to one embodiment of the present invention will be described below in details with reference to the attached drawings.

Figure 1:
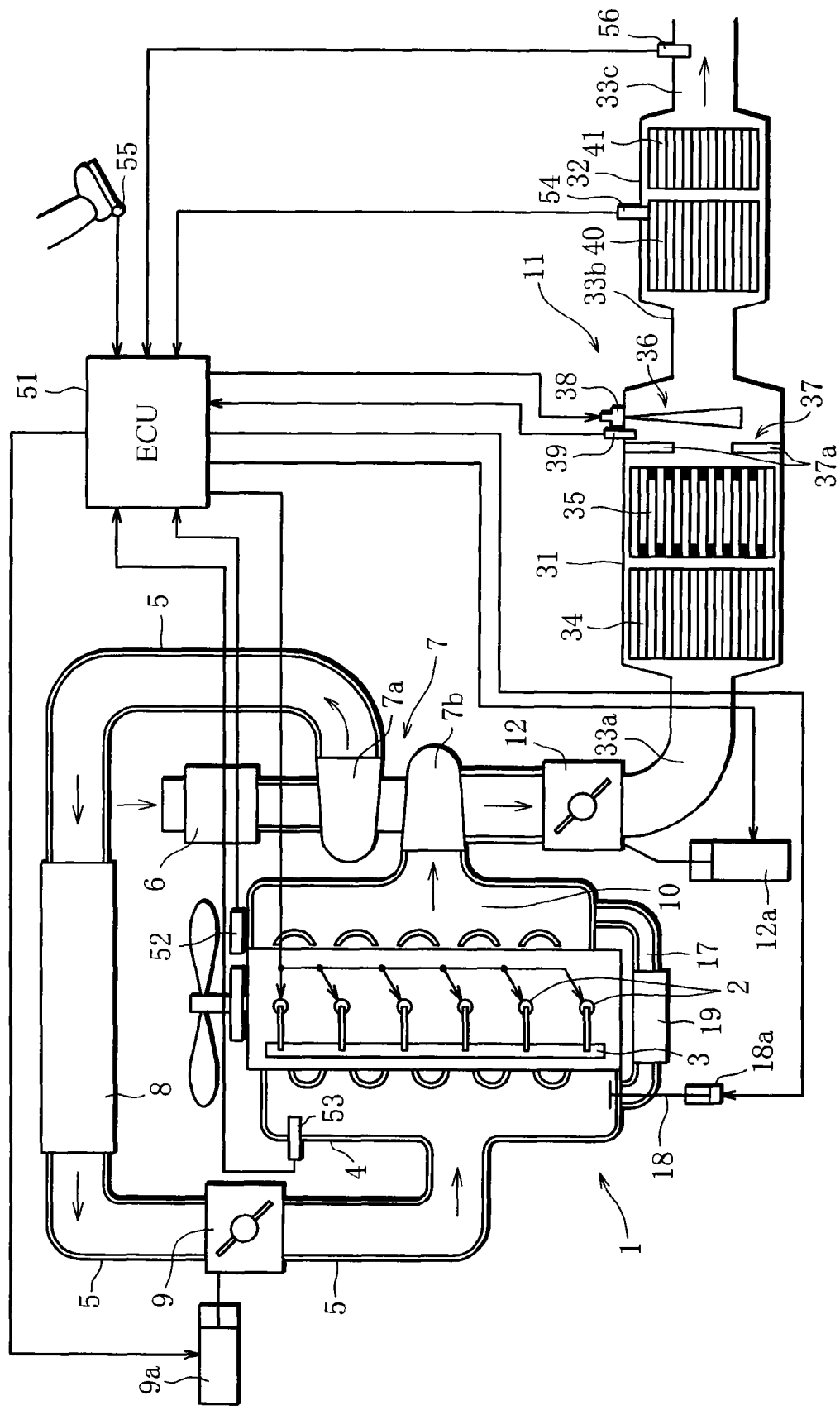
FIG. 1 is a view showing the entire configuration of an exhaust purification apparatus for an engine according to one embodiment.

FIG. 1 is a view showing the entire configuration of the exhaust purification apparatus for an engine according to the present embodiment. An engine 1 is constructed as an in-line six-cylinder diesel engine that is installed in a vehicle. A fuel injection valve 2 is provided to each cylinder of the engine 1. The fuel injection valves 2 are supplied with pressure fuel from a common rail 3 and open with timing appropriate to an operational state of the engine 1 to inject the fuel into the cylinders.

An intake manifold 4 is mounted on an intake side of the engine 1. In an intake passage 5 connected to the intake manifold 4, there are interposed an air cleaner 6, a compressor 7a of a turbocharger 7, an intercooler 8, and an intake throttle valve 9 that is driven to open and close by an actuator 9a, in the order from upstream to downstream.

An exhaust manifold 10 is mounted on an exhaust side of the engine 1. An exhaust passage 11 is connected to the exhaust manifold 10 through a turbine 7b of the turbocharger 7 which is mechanically connected to the compressor 7a. Interposed in the exhaust passage 11 is an exhaust throttle valve 12 that is driven to open and close by an actuator 12a.

During the operation of the engine 1, intake air that is introduced through the air cleaner 6 into the intake passage 5 is pressurized by the compressor 7a of the turbocharger 7. The pressurized intake air flows through the intercooler 8, the intake throttle valve 9 and the intake manifold 4 to be divided to the cylinders, and is introduced into the cylinders during intake strokes of the cylinders. The fuel is injected from the fuel injection valves 2 into the cylinders with designated timing, and is ignited and combusted in the vicinity of a compression top dead center. Post-combustion exhaust gas passes the exhaust manifold 10 and drives to rotate the turbine 7b. The exhaust gas is then emitted outside through the exhaust passage 11.

The intake manifold 4 and the exhaust manifold 10 are connected to each other through an EGR passage (EGR means) 17. In the EGR passage 17, there are interposed an EGR valve (EGR means) 18 that is driven to open and close by an actuator 18a, and an EGR cooler 19. During the operation of the engine 1, a portion of the exhaust gas is recirculated as EGR gas from the exhaust manifold 10 side to the intake manifold 4 side according to an opening degree of the EGR valve 18.

The exhaust purification apparatus according to the present invention is interposed in the exhaust passage 11. The exhaust purification apparatus is accommodated in an upstream casing 31 and in a downstream casing 32. Basically, the casings 31 and 32 and a silencer, not shown, are connected to one another through pipes 33a to 33c. The exhaust passage 11 is formed of these members. In the order from the upstream end of the exhaust passage 11, the exhaust throttle valve 12 disposed downstream of the turbine 7b of the turbocharger 7 is connected to the upstream casing 31 through a first pipe 33a. The upstream casing 31 is connected to the downstream casing 32 through a second pipe 33b. The downstream casing 32 is connected to the silencer through a third pipe 33c. The silencer has a rear end that is open to the atmosphere.

The upstream casing 31 and the downstream casing 32 each have a substantially cylindrical shape extending in an longitudinal direction of the vehicle. A pre-stage oxidation catalyst 34 is accommodated on the upstream side in the upstream casing 31. A wall flow-type DPF (diesel particulate filter) 35 is accommodated on the downstream side in the upstream casing 31. The DPF 35 has a function of collecting particulates contained in exhaust gas. The upstream casing 31 extends rearwards from a position at which the DPF 35 is situated, keeping the same sectional shape. There is then formed space downstream of the DPF 35 within the upstream casing 31. The space will be referred to as a spray diffusion chamber 36.

Disposed in the spray diffusion chamber 36 is a fin device 37 for creating a swirling flow in the exhaust gas. The fin device 37 of the present embodiment is formed of many fins 37a fixed in an upright position onto an inner circumferential wall of the upstream casing 31. Each fin 37a of the fin device 37 is arranged at a predetermined angle to an exhaust flow direction, thereby creating a swirling flow with its center on the axis of the upstream casing 31.

An injection nozzle 38 is fixed onto an outer circumferential wall of the upstream casing 31 to be located downstream of the fin device 37. The injection nozzle 38 is so configured as to be capable of injecting urea-water, which is supplied by pressure from a tank, not shown, into the spray diffusion chamber 36. The injection nozzle 38 is designed to inject the urea-water in a direction intersecting with the exhaust flow direction at right angles, and at the same time, to be oriented to the center of the upstream casing 31. A temperature sensor 39 is placed in between the fin device 37 and the injection nozzle 38. The temperature sensor 39 measures exhaust temperature Tnzl inside the spray diffusion chamber 36.

An SCR catalyst (selective reduction-type NOx catalyst) 40 is accommodated on the upstream side in the downstream casing 32. A post-stage oxidation catalyst 41 is accommodated on the downstream side in the downstream casing 32. As mentioned later, the SCR catalyst 40 has a function of purifying exhaust gas by selectively reducing NOx contained in the exhaust gas.

An ECU (electronic control unit) 51 is installed in the vehicle, which includes, although not shown, an input/output device, memory devices (such as ROM and RAM) for storing control programs, control maps, etc., a central processing unit (CPU), timer counters, and the like. Connected to an input side of the ECU 51 are various sensors including the temperature sensor 39, a revolution speed sensor 52, an intake $O_2$ sensor (oxygen-concentration detection means) 53, a catalyst temperature sensor 54, an accelerator position sensor 55, a NOx sensor 56, etc.

The revolution speed sensor 52 detects revolution speed Ne of the engine 1. The intake $O_2$ sensor 53 is disposed in the intake manifold 4 and detects $O_2$ concentration in the intake air supplied into the cylinders. The catalyst temperature sensor 54 measures SCR temperature Tcat, namely, the temperature of the SCR catalyst 40. The accelerator position sensor 55 detects operation amount Acc of an accelerator. The NOx sensor 56 detects NOx emission amount from the SCR catalyst 40.

Connected to an output side of the ECU 51 are various devices including actuators 9a, 12a and 18a of the intake throttle valve 9, the exhaust throttle valve 12 and the EGR valve 18, respectively, the fuel injection valves 2, the injection nozzle 38, etc.

For example, the ECU 51 sets fuel injection amount Q according to a given map on the basis of the engine revolution speed Ne and the accelerator operation amount Acc, and determines fuel injection timing IT according to a given map on the basis of the fuel injection amount Q and the engine revolution speed Ne. The ECU 51 controls the drive of the fuel injection valves 2 according to the fuel injection amount Q and the fuel injection timing IT. The ECU 51 thus controls the fuel injection valves 2 to inject fuel into the cylinders, to thereby operate the engine 1.

On the basis of the fuel injection amount Q and the engine revolution speed Ne, the ECU 51 discriminates between a zone in which EGR is carried out and a zone in which EGR is not carried out. In the EGR execution zone, the ECU 51 controls the actuators 18a and 9a of the EGR valve 18 and the intake throttle valve 9, respectively, according to target EGR amount that is determined from the map. Due to this EGR control, in the EGR execution zone, the exhaust gas within the exhaust manifold 10 is recirculated as EGR gas through the EGR passage 17 to the intake manifold 4 by opening the EGR valve 18. At the same time, negative pressure within the intake manifold 4 is increased by closing the intake throttle valve 9, whereby the recirculation of the EGR gas is promoted. The EGR gas recirculation corresponding to the target EGR amount suppresses fuel temperatures in the cylinders, and reduces the NOx emission amount of the engine 1.

The ECU 51 further controls urea-water injection amount from the injection nozzle 38 according to the exhaust temperature Tnzl measured by the temperature sensor 39, and the like. The injected urea-water is hydrolyzed by exhaust gas heat and water vapor contained in exhaust gas, thereby producing ammonia ($NH_3$). Since the SCR catalyst 40 uses the ammonia as a reducing agent, the NOx contained in exhaust gas is reduced into harmless $N_2$ and the exhaust gas is purified. In this process, excessive ammonia is removed from the exhaust gas by the post-stage oxidation catalyst 41.

Figure 2:
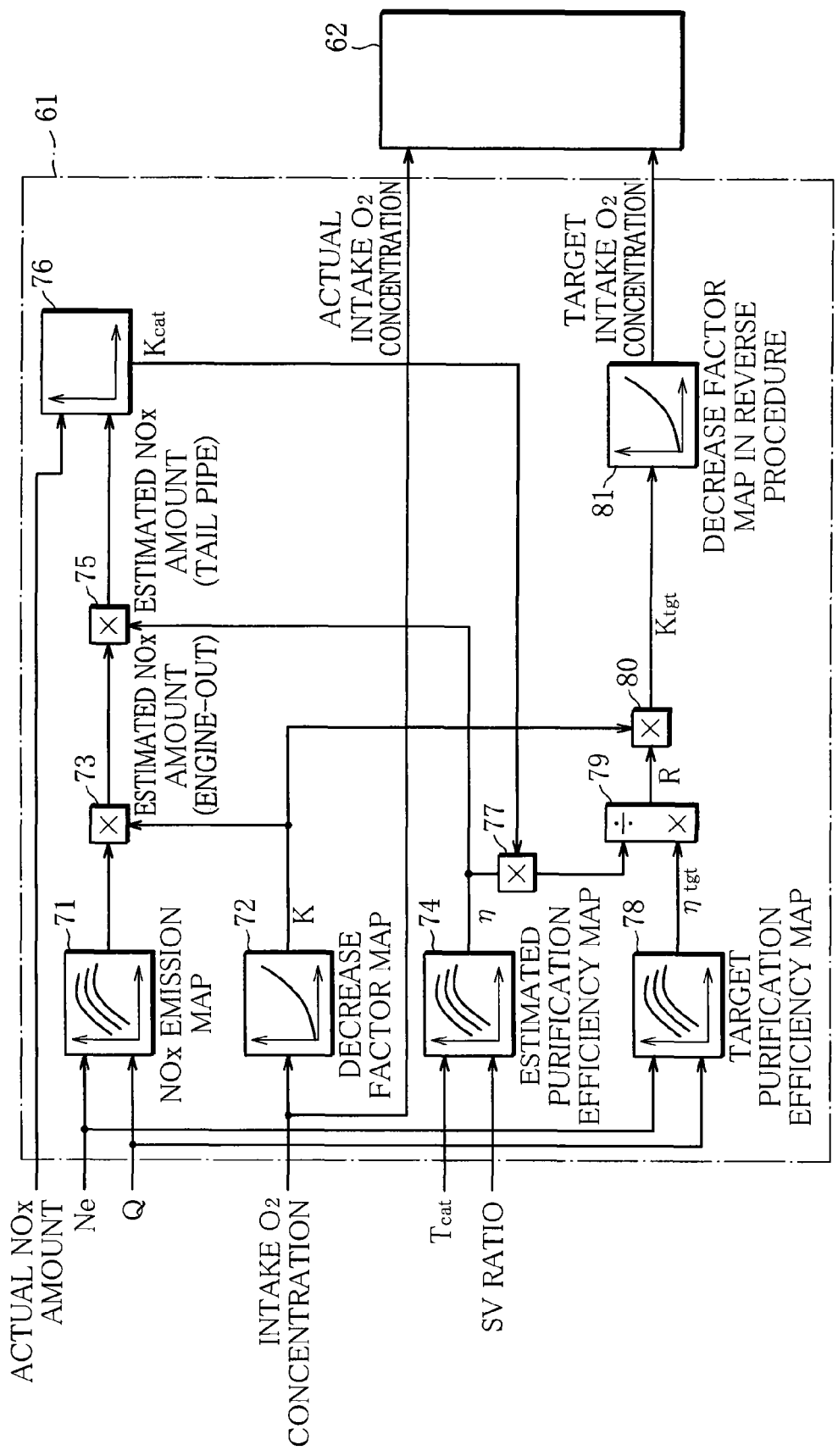
FIG. 2 is a block diagram showing the operating procedures of an ECU for purification efficiency complement control.

As stated in the Description of Related Art, because of vehicle running conditions such as traffic jams in urban districts or environmental conditions such as cold regions in which outdoor air temperature is low, a problem is caused that the temperature of the SCR catalyst 40 falls below activation temperature, and then that exhaust purification efficiency with respect to NOx drastically decreases. In view of this problem, the present embodiment offers a measure for compensating a decrease in the exhaust purification efficiency of the SCR catalyst 40 with respect to NOx by controlling the EGR amount according to a decrease amount of the exhaust purification efficiency when the efficiency decreases due to a temperature drop. Purification efficiency complement control that is performed by the ECU 51 to achieve the measure will be described below with reference to FIG. 2. FIG. 2 is a block diagram showing the operating procedures of the ECU 51 for the purification efficiency complement control.

As constituents for implementing the purification efficiency complement control, the ECU 51 has a target-value calculation section 61 and an EGR/throttle control section (EGR control means) 62. The target-value calculation section 61 carries out a function of calculating a target value of intake $O_2$ concentration correlating to the EGR amount required to compensate the decrease in the exhaust purification efficiency of the SCR catalyst 40. The EGR/throttle control section 62 carries out a function of adjusting actual intake $O_2$ concentration to the target intake $O_2$ concentration by controlling the drive of the actuators 9a and 18a of the intake throttle valve 9 and the EGR valve 18, respectively. The EGR/throttle control section 62 further carries out EGR control based upon the EGR execution zone and the EGR non-execution zone.

First, the target-value calculation section 61 will be described. A NOx-exhaust-amount calculation section 71 obtains NOx amount emitted from the cylinders of the engine 1, or so-called engine-out NOx emission amount, from a given map on the basis of the engine revolution speed Ne and the fuel injection amount Q. This map is formed on the premise of NOx emission characteristics of the engine 1 in a state where the EGR is not carried out. The NOx emission amount obtained here is free from an influence of suppression of combustion speed, which is induced by the EGR gas recirculation.

A NOx-decrease-factor calculation section (NOx-decrease-factor calculation means) 72 obtains a NOx decrease factor K from a given map on the basis of the $O_2$ concentration in the intake gas supplied into the cylinders (intake $O_2$ concentration). The NOx decrease factor K is an index indicative of a decrease state of the engine-out NOx emission amount, which is brought by the EGR gas recirculation. FIG. 3 shows characteristics of the map. As illustrated in FIG. 3, the intake $O_2$ concentration indicated on the basis of a scale on the horizontal axis varies according to the EGR gas amount (EGR amount) that is recirculated from the exhaust to the intake side. To be more concrete, when the EGR is not carried out (that is, the EGR amount is zero), the intake $O_2$ concentration becomes 21 percent corresponding to a general atmospheric composition, and the NOx decrease factor K is 1.0 that is a maximum value. From this state, the intake $O_2$ concentration decreases in proportion to increase in the EGR amount. The NOx production rate within the cylinders accordingly decreases due to suppression of the combustion speed. Consequently, the NOx decrease factor K shows a small value.

The intake $O_2$ concentration may be calculated from the operational state of the engine 1, instead of detection using the sensor. A method thereof has been well known and therefore will not be described here in details. For example, the intake $O_2$ concentration may be obtained in the following manner. First, the EGR gas amount supplied into the cylinders is calculated from a fresh air amount obtained from the output of an airflow sensor, not shown, or the like. Subsequently, the concentration of residual $O_2$ in the EGR gas is estimated from the fuel injection amount. The $O_2$ concentration in the intake gas supplied into the cylinders can be estimated from the residual $O_2$ concentration and the $O_2$ concentration in fresh air, which have been obtained in the above-mentioned manner.

The NOx emission amount obtained by the NOx-emission-amount calculation section 71 and the NOx decrease factor K obtained by the NOx-decrease-factor calculation section 72 are fed to a multiplier section 73 to be multiplied by each other. The NOx emission amount obtained by multiplying the NOx emission amount obtained by the NOx-emission-amount calculation section 71 by the NOx decrease coefficient K means the engine-out NOx emission amount, which reflects an execution state of the EGR.

An estimated-purification-efficiency calculation section (exhaust-purification-efficiency estimation means) 74 obtains estimated exhaust purification efficiency η of the SCR catalyst 40 with respect to NOx from a given map on the basis of the SCR temperature Tcat and SV ratio. Both the SCR temperature Tcat and the SV ratio are factors that influence the exhaust purification efficiency of the SCR catalyst 40 with respect to NOx. In other words, as the SCR temperature Tcat lowers, the exhaust purification efficiency of the SCR catalyst 40 with respect to NOx decreases. The SV ratio is a ratio between an exhaust flow rate of the engine 1 and the capacity of the SCR catalyst 40. As the exhaust flow rate increases relatively to the catalyst capacity, the exhaust amount per unit capacity which has to be processed in the SCR capacity 40 becomes larger, and accordingly, the exhaust purification efficiency of the SCR catalyst 40 with respect to NOx decreases. Although the catalyst capacity is previously known, the exhaust flow rate varies according to the operational state of the engine 1. For this reason, the SV ratio is obtained from the catalyst capacity and the exhaust flow rate that is obtained by adding the fresh air amount obtained, for example, using the airflow sensor to the fuel injection amount.

The engine-out NOx emission amount and the estimated exhaust purification efficiency η are fed to the multiplier section 75 and multiplied by each other. The NOx emission amount obtained after the engine-out NOx emission amount is multiplied by the estimated exhaust purification efficiency η means NOx emission amount that is emitted from a tail pipe through the SCR catalyst 40 into the atmosphere. Hereinafter, such NOx emission amount obtained by using the engine-out NOx emission amount and the estimated exhaust purification efficiency η will be referred to as estimated NOx emission amount.

The estimated NOx emission amount is fed to a deterioration-factor calculation section (deterioration detection means) 76 together with actual NOx emission amount that is detected by the NOx sensor 56. The deterioration-factor calculation section 76 obtains a deterioration factor Kcat of the SCR catalyst 40 on the basis of these NOx emission amounts. In a series of the above-described calculation processes, the estimated NOx emission amount is calculated on the premise that the SCR catalyst 40 has not yet been deteriorated. The NOx sensor 56 detects the actual NOx emission amount reflecting a current deterioration state of the SCR catalyst 40 and showing a value equal to or higher than the estimated NOx emission amount. The deterioration-factor calculation section 76 compares changes of the both values within a certain measure of time, to thereby find the deterioration factor Kcat as an index reflecting the current deterioration state of the SCR catalyst 40. The deterioration factor Kcat becomes 1.0 when the SCR catalyst 40 is not deteriorated, and decreases in proportion as the deterioration of the SCR catalyst 40 is advanced.

The deterioration factor Kcat calculated by the deterioration-factor calculation section 76 is fed to a multiplier section 77, and is multiplied by the estimated exhaust purification efficiency η from the estimated-purification-efficiency calculation section 74. The value obtained by the multiplication can be regarded as an estimated value of the exhaust purification efficiency of the SCR catalyst 40 with respect to NOx, reflecting the current deterioration state of the SCR catalyst 40.

A target-purification-efficiency calculation section (target-exhaust-purification-efficiency calculation means) 78 obtains target exhaust purification efficiency ηtgt of the SCR catalyst 40 with respect to NOx from a given map on the basis of the engine revolution speed Ne and the fuel injection amount Q. The target exhaust purification efficiency ηtgt is optimum exhaust purification efficiency of the SCR catalyst 40 for each operating zone of the engine 1. The target exhaust purification efficiency ηtgt is obtained as a target value of the exhaust purification efficiency with respect to NOx, which is most suitable for each operating zone in consideration of conditions including, for example, smoke emission amount and the like which has opposite emission characteristics to NOx and is therefore in trading-off relationship with the NOx emission amount.

The target exhaust purification efficiency ηtgt and the estimated exhaust purification efficiency η multiplied by the deterioration factor Kcat in the multiplier section 77 are fed to a deviation-ratio calculation section 79. The deviation-ratio calculation section 79 calculates a purification efficiency deviation ratio R (=η/ηtgt) as ratio between both these values. The estimated NOx purification efficiency η outputted from the multiplier section 77 is actual exhaust purification efficiency with respect to NOx, reflecting the current temperature drop and deterioration of the SCR catalyst 40, and the like. The estimated NOx purification efficiency η therefore, needless to say, shows a lower value than the target exhaust purification efficiency ηtgt that shows the optimum value. Consequently, the purification efficiency deviation ratio R that is a ratio between the target exhaust purification efficiency ηtgt and the estimated exhaust purification efficiency η can be regarded as an index indicative of how much the exhaust purification efficiency of the SCR catalyst 40 with respect to NOx should be improved.

The calculated purification efficiency deviation ratio R is fed to a multiplier section 80. The purification efficiency deviation ratio R is multiplied by the NOx decrease factor K calculated by the NOx-decrease-factor calculation section 72, and thereby the target NOx decrease factor Ktgt is obtained. In other words, the target NOx decrease factor Ktgt is calculated from the current NOx decrease factor K as a value corrected according to a required improvement amount of the exhaust purification efficiency with respect to NOx. On the basis of the target NOx decrease factor Ktgt, a target-intake-$O_2$-concentration calculation section (target-oxygen-concentration calculation means) 81 obtains target intake $O_2$ concentration from the target NOx decrease factor Ktgt by the opposite procedure to the NOx-decrease-factor calculation section 72 according to the map shown in FIG. 3.

The foregoing is the processing carried out in the target-value calculation section 61 of the ECU 51. The calculated target intake $O_2$ concentration is fed to the EGR/throttle control section 62 together with the actual intake $O_2$ concentration detected by the intake $O_2$ sensor 53. The EGR/throttle control section 62 carries out feedback control of the intake $O_2$ concentration on the basis of the target intake $O_2$ concentration by controlling the drive of the actuators 9a and 18a of the intake throttle valve 9 and the EGR valve 18, respectively.

In the above-mentioned manner, the target-value calculation section 61 and the EGR/throttle control section 62 of the ECU 51 carry out the purification efficiency complement control. The decrease in the exhaust purification efficiency of the SCR catalyst 40 with respect to NOx is compensated by controlling the EGR amount in a manner described below if the exhaust purification efficiency decreases, for example, attributable to traffic jams in urban districts or the temperature drop of the SCR catalyst 40 which is caused by a decrease in outdoor air temperature or the like, or attributable to the deterioration of the SCR catalyst 40 due to long-term operation of the SCR catalyst 40 or the like.

When the temperature of the SCR catalyst 40 drops, the estimated NOx purification efficiency η is set to be reduced according to a decrease in the SCR temperature Tcat in the estimated-purification-efficiency calculation section 74. When the SCR catalyst 40 is deteriorated, the estimated exhaust purification efficiency η is set to be reduced by being multiplied by the deterioration factor Kcat in the multiplier section 77 in accordance with a decrease in the deterioration factor Kcat calculated by the deterioration-factor calculation section 76. In each case, the purification efficiency deviation ratio R is set on a decrease side in the deviation-ratio calculation section 79.

In the multiplier section 80, the purification efficiency deviation ratio R that has been set on the decrease side in this manner is multiplied by the NOx decrease factor K corresponding to the current intake $O_2$ concentration, to thereby calculate the target NOx decrease factor Ktgt showing a lower value. Subsequently, the target-intake-$O_2$-concentration calculation section 81 obtains target intake $O_2$ concentration corresponding to the target NOx decrease factor Ktgt. The EGR/throttle control section 62 carries out the control on the EGR amount according to the target intake $O_2$ concentration, thereby controlling actual intake $O_2$ concentration to target $O_2$ concentration.

For example, as shown in FIG. 3, in a case where the current intake $O_2$ concentration is controlled to A, when the purification efficiency complement control is implemented in response to a decrease in the exhaust purification efficiency of the SCR catalyst 40 with respect to NOx, the NOx decrease factor K at the moment is corrected to the target NOx decrease factor Ktgt on the basis of the purification efficiency deviation ratio R. The target intake $O_2$ concentration is set to B according to the target NOx decrease factor Ktgt, and is applied to the control on the EGR amount. The EGR gas amount recirculated to the intake side of the engine 1 is accordingly increased by a decrease amount of the exhaust purification efficiency of the SCR catalyst 40 with respect to NOx. Therefore, as a result of suppression of the combustion temperatures within the cylinders, the NOx emission amount from the cylinders is reduced. Accordingly, if the temperature of the SCR catalyst 40 is in a low temperature range or in a situation where the deterioration of the SCR catalyst 40 is advanced, it is possible to realize sufficient exhaust purification performance with respect to NOx.

Since the exhaust purification apparatus of the present invention compensates the decrease of the exhaust purification efficiency of the SCR catalyst 40 with respect to NOx by using the existing EGR passage 17 and the existing EGR valve 18, the exhaust purification apparatus is the same in configuration as conventional apparatus. It is then possible to obtain the above-described operation and advantages without complicating the configuration of the exhaust purification apparatus.

If the decrease amount of the exhaust purification efficiency with respect to NOx, which is produced by the temperature drop of the SCR catalyst 40 or the like is all transformed into the EGR amount, there is a possibility of increasing smoke as a result of excessive increase of the EGR amount, depending upon the operating zone. To solve this problem, for example, a lower limit value of the intake $O_2$ concentration may be set for each operating zone of the engine 1 so that a maximum of the EGR gas amount is limited according to the lower limit value. If such a lower limit value of the intake $O_2$ concentration is used in the above-described embodiment, the EGR/throttle control section 62 implements the control on the EGR amount by limiting the EGR gas amount so that the EGR gas amount does not exceed a predetermined upper limit value, on the basis of the lower limit value of the intake $O_2$ concentration. As the restriction on the intake $O_2$ concentration leads to the restriction on an excess air ratio of the engine 1, if the engine is of a type that implements the EGR control according to a target excess air ratio determined by the operational state, the lower limit vale may be set at the target excess air ratio. If such a lower limit value of the intake $O_2$ concentration or the lower limit value of the target excess air ratio is used in the above-described embodiment, the EGR/throttle control section 62 implements the control on the EGR amount so that a recirculation amount of the EGR gas does not exceed a predetermined upper limit amount, on the basis of the lower limit value of the intake $O_2$ concentration or that of the target excess air ratio. With these controls, if the EGR gas amount is limited to be equal to or smaller than the predetermined upper limit amount, it is possible to prevent a smoke increase attributable to an excessive decrease in the excess air ratio within the cylinders, in addition to the operation and advantages of the above-described embodiment.

Although this is the end of the descriptions of the embodiment, an aspect of the present invention is not limited to the embodiment. For example, in the embodiment, the invention is applied to the exhaust purification apparatus designed for the diesel engine 1. However, the present invention is not exclusively applied to the diesel engine. The invention may be applied, for example, to a gasoline engine. The EGR/throttle control section 62 controls the EGR amount by controlling the opening degrees of the intake throttle valve 9 and the EGR valve 18. It is also possible to increase exhaust pressure by adding control on the opening degree of the exhaust throttle valve 12, and controlling the exhaust throttle valve 12 during the EGR control, using the EGR/throttle control section 62.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust purification apparatus for an engine comprising:
   a selective reduction-type NOx catalyst that is interposed in an exhaust passage of an engine and selectively reduces NOx contained in exhaust gas of the engine by using ammonia as a reducing agent;
   an EGR unit that recirculates exhaust gas of the engine to an intake side of the engine; and
   a control unit that is coupled to the EGR unit and controls the operation of the EGR unit;
   wherein the control unit includes:
   an exhaust-purification-efficiency estimation section that estimates exhaust purification efficiency of the NOx catalyst with respect to NOx;
   a target-exhaust-purification-efficiency calculation section that calculates target exhaust purification efficiency with respect to NOx on the basis of an operational state of the engine;
   an oxygen-concentration detection section that detects oxygen concentration in intake gas supplied into cylinders of the engine;
   a NOx-decrease-factor calculation section that calculates a decrease factor as an index numeral indicative of a decrease state of a NOx production rate in the cylinders of the engine at the oxygen concentration detected by the oxygen-concentration detection section on the basis of NOx production characteristics in the cylinders of the engine in relation to the oxygen concentration in the intake gas;
   a target-oxygen-concentration calculation section that corrects the NOx decrease factor according to a ratio between the exhaust purification efficiency estimated by the exhaust-purification-efficiency estimation section and the target exhaust purification efficiency, and calculating oxygen concentration corresponding to the corrected NOx decrease factor as target oxygen concentration on the basis of the NOx production characteristics; and
   an EGR control section that controls the EGR unit according to the target oxygen concentration calculated by the target-oxygen-concentration calculation section.

2. The exhaust purification apparatus for an engine according to claim 1, further comprising a deterioration detection section that detects a deterioration state of the NOx catalyst, wherein
   the target-oxygen-concentration calculation section corrects the exhaust purification efficiency estimated by the exhaust-purification-efficiency estimation section according to the deterioration state of the NOx catalyst, which is detected by the deterioration detection section, and applies the corrected estimated exhaust purification efficiency to the correction of the NOx decrease factor.

3. The exhaust purification apparatus for an engine according to claim 1, wherein
   the EGR control section limits an amount of the exhaust gas that is recirculated by the EGR unit, to be equal to or smaller than predetermined upper limit amount so as to achieve an excess air ratio that is sufficient to suppress the smoke released from the engine.

4. The exhaust purification apparatus for an engine according to claim 1, further comprising a throttle actuator coupled to the control unit, wherein the EGR control section controls the operation of the throttle actuator.

* * * * *